(12) United States Patent
Bartell et al.

(10) Patent No.: US 11,700,208 B2
(45) Date of Patent: *Jul. 11, 2023

(54) SELECTIVELY BYPASSING A ROUTING QUEUE IN A ROUTING DEVICE IN A FIFTH GENERATION (5G) OR OTHER NEXT GENERATION NETWORK

(71) Applicant: AT&T Intellectual Property I, L.P., Atlanta, GA (US)

(72) Inventors: John Barry Bartell, Alpharetta, GA (US); James Gordon Beattie, Jr., Bergenfield, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/514,904

(22) Filed: Oct. 29, 2021

(65) Prior Publication Data

US 2022/0052958 A1 Feb. 17, 2022

Related U.S. Application Data

(63) Continuation of application No. 16/794,534, filed on Feb. 19, 2020, now Pat. No. 11,190,457.

(51) Int. Cl.
*H04L 47/56* (2022.01)
*H04L 47/283* (2022.01)
(Continued)

(52) U.S. Cl.
CPC ............ *H04L 47/56* (2013.01); *H04L 45/745* (2013.01); *H04L 47/283* (2013.01); *H04L 47/6255* (2013.01)

(58) Field of Classification Search
CPC ..... H04L 45/745; H04L 47/56; H04L 47/283; H04L 47/6255
See application file for complete search history.

(56) References Cited

U.S. PATENT DOCUMENTS 5,299,259 A 3/1994 Otto
5,402,416 A 3/1995 Cieslak et al.
(Continued)

OTHER PUBLICATIONS

Bartell "Selectively Sending Routing Information to Routing Devices in a Fifth Generation (5G) or Other Next Generation Network" U.S. Appl. No. 16/804,429, filed Feb. 28, 2020, 43 pages.
(Continued)

*Primary Examiner* — Melanie Jagannathan
(74) *Attorney, Agent, or Firm* — Amin, Turocy & Watson, LLP

(57) ABSTRACT

The technologies described herein are generally directed toward shedding processing loads associated with route updates. According to an embodiment, a system can comprise a processor and a memory that can enable operations facilitating performance of operations including facilitating receiving, from a second routing device via a network, a communication. The operations can further comprise, in response to a queueing delay being determined to be less than a threshold, queueing, in the queue, the communication for a third routing device selected according to a first selection process as being on a route to a destination routing device for the communication. Further, operations to, in response to the queueing delay of the queue being determined to be equal to or above the threshold, transmit the communication to a fourth routing device, with the fourth routing device being selected according to a second selection process different than the first selection process.

20 Claims, 10 Drawing Sheets

(51) Int. Cl.
*H04L 47/625* (2022.01)
*H04L 45/745* (2022.01)

(56) References Cited

U.S. PATENT DOCUMENTS

| | | | |
|---|---|---|---|
| 6,751,194 | B1 | 7/2004 | Ueno |
| 6,990,113 | B1 | 1/2006 | Wang et al. |
| 7,088,677 | B1 | 8/2006 | Burst, Jr. |
| 7,088,710 | B1 | 8/2006 | Johnson et al. |
| 7,120,113 | B1 | 10/2006 | Zhang et al. |
| 7,675,857 | B1 | 3/2010 | Chesson |
| 8,385,210 | B1 | 2/2013 | Weill et al. |
| 9,191,282 | B2 | 11/2015 | Kakadia et al. |
| 10,735,339 | B1 | 8/2020 | Mathews et al. |
| 2003/0152151 | A1 | 8/2003 | Hsieh et al. |
| 2003/0235217 | A1 | 12/2003 | Verreault |
| 2004/0218617 | A1 | 11/2004 | Sagfors |
| 2006/0067213 | A1 | 3/2006 | Evans et al. |
| 2007/0297435 | A1 | 12/2007 | Bucknell et al. |
| 2010/0023634 | A1 | 1/2010 | Labonte et al. |
| 2012/0151068 | A1* | 6/2012 | Su .................... H04L 43/10 709/227 |
| 2014/0160935 | A1 | 6/2014 | Zecharia et al. |
| 2014/0341042 | A1 | 11/2014 | Racz et al. |
| 2016/0021018 | A1 | 1/2016 | Hui et al. |
| 2016/0359592 | A1 | 12/2016 | Kulshreshtha et al. |
| 2019/0363976 | A1* | 11/2019 | Thu .................. H04L 45/306 |
| 2019/0379610 | A1 | 12/2019 | Srinivasan et al. |
| 2020/0053018 | A1 | 2/2020 | White et al. |
| 2021/0409335 | A1* | 12/2021 | Zhu ..................... H04L 47/24 |
| 2022/0060347 | A1* | 2/2022 | Sevindik ............ H04W 28/06 |

OTHER PUBLICATIONS

Bartell, "Selectively Rerouting Network Traffic in a Fifth Generation (5G) or Other Next Generation Network", U.S. Appl. No. 16/793,283, filed Feb. 18, 2020, 48 pages.

Bartell, "Selectively Shedding Processing Loads Associated With Updates to a Routing Table in a Fifth Generation (5G) or Other Next Generation Network", U.S. Appl. No. 16/793,508, filed Feb. 18, 2020, 50 pages.

Bartell, "Selectively Using a Co-processor to Process Network Routing Information in a Fifth Generation (5G) or Other Next Generation Network", U.S. Appl. No. 16/804,521, filed Feb. 28, 2020, 54 pages.

Bartell et al. "Establishing Domains of Authority for Routing Table Updates Between Routing Devices in a Fifth Generation (5G) or Other Next Generation Network", U.S. Appl. No. 16/804,568, filed Feb. 28, 2020, 55 pages.

Non-Final Office Action received for U.S. Appl. No. 16/794,534 dated Mar. 18, 2021, 41 pages.

Notice of Allowance received for U.S. Appl. No. 16/794,534 dated Aug. 3, 2021, 19 pages.

* cited by examiner

SELECTIVELY BYPASSING A ROUTING QUEUE IN A ROUTING DEVICE IN A FIFTH GENERATION (5G) OR OTHER NEXT GENERATION NETWORK

RELATED APPLICATION

The subject patent application is a continuation of, and claims priority to, U.S. patent application Ser. No. 16/794,534 (now U.S. Pat. No. 11,190,457), filed Feb. 19, 2020, and entitled "SELECTIVELY BYPASSING A ROUTING QUEUE IN A ROUTING DEVICE IN A FIFTH GENERATION (5G) OR OTHER NEXT GENERATION NETWORK," the entirety of which application is hereby incorporated by reference herein.

TECHNICAL FIELD

The subject application is related to computer networking, and, for example, using a router to select network traffic routes in a fifth generation (5G) or other next generation network.

BACKGROUND

As networks continue to be expanded to handle larger amounts of information, the need for rapid and efficient routing within networks continues to increase. This is especially true when existing networks are used to carry larger traffic before hardware capabilities have been increased.

With traditional routing strategies, routing devices can receive routing information from other, different routing devices, with continual hardware upgrades matching increases in network use. With recent dramatic increases in demand for network bandwidth however, in some circumstances, even traditional hardware upgrades can be rendered ineffective. For example, in some circumstances, because of increases in network capacity requirements, the content, amount, and frequency of updates to routing information shared between routing devices can fail to sufficiently model network conditions.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
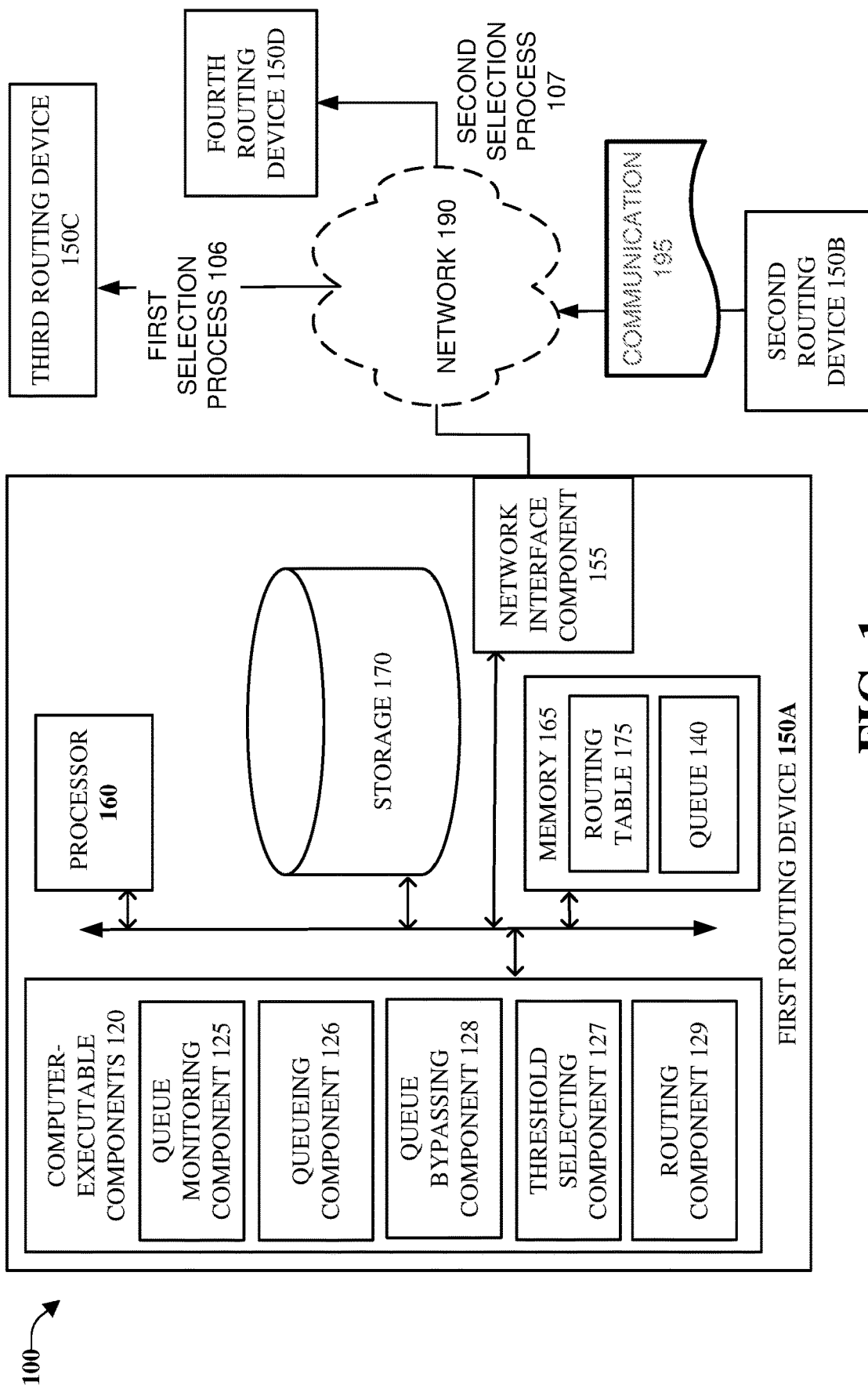
FIG. 1 is an architecture diagram of an example system that can facilitate selectively bypassing a routing queue in a routing device, in accordance with one or more embodiments.

Generally speaking, one or more embodiments can provide improved routing among multiple routing devices, in fifth generation (5G) or other next generation networks. In addition, one or more embodiments described herein can be directed towards a multi-connectivity framework that supports the operation of New Radio (NR, sometimes referred to as fifth generation (5G). As will be understood, one or more embodiments can allow an integration of user equipment (UEs) with network assistance, by supporting control and mobility functionality on cellular links (e.g. LTE or NR). One or more embodiments can provide benefits including, system robustness, reduced overhead, and global resource management, while facilitating direct communication links via a NR sidelink.

In some embodiments, the non-limiting term "radio network node" or simply "network node," "radio network device or simply "network device" are used herein. These terms may be used interchangeably, and refer to any type of network node that can serve user equipment and/or be connected to other network node or network element or any radio node from where user equipment receives signal. Examples of radio network nodes are Node B, base station (BS), multi-standard radio (MSR) node such as MSR BS, gNodeB, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS), etc. As noted above, some embodiments are described in particular for 5G new radio systems. The embodiments are however applicable to any radio access technology (RAT) or multi-RAT system where the user equipment operates using control signals, e.g. LTE FDD/TDD, WCMDA/HSPA, GSM/GERAN, Wi Fi, WLAN, WiMax, CDMA2000, etc.

In some embodiments, the non-limiting term router, routing device, or router device is used. This term can refer to any type of electronic device that can facilitate the connection of one or more nodes to a network, and between two or more nodes in the network. It should further be noted that, one or more embodiments used in examples herein utilize routers that employ an approach to network connectivity that is based on minimizing delay by employing large numbers of route updates throughout the network, e.g., minimizing delay in a network route by making available frequently updated information about the network routes (e.g., route information discussed below) for use in planning network routes, e.g., link transmission speed, and queue delays.

One approach to implementing embodiments of this delay-minimizing approach to routing is to have routers frequently generate route updates for other routers, with routers receiving updates, rapidly processing the route updates, and using the processed route updates to direct network traffic to routes that can reduce delays. One aspect of this approach to routing is that it can utilize a router to process up to millions of route updates per second, and this level of route processing can be improved by one or more of the embodiments described herein. It should be noted that, as discussed further below, in one or more non-limiting embodiments, queues of routing devices can be monitored and bypassed in certain circumstances, e.g., when they are overloaded.

Further, notwithstanding the relationship between embodiments of this network routing approach and embodiments of bypassing routers described herein, the combinations of features described in one or more embodiments, and recited in the claims below, can be applied to other approaches to network routing beyond approaches described in one or more of the examples used herein. In example approaches to routing that can beneficially employ one or more embodiments, routing devices can perform a variety of operations to improve the routing of communications in a multi-node network, e.g., by facilitating selectively bypassing a routing queue in a routing device on the network.

FIG. 1 is an architecture diagram of an example system 100 that can facilitate selectively bypassing a routing queue in a routing device, in accordance with one or more embodiments. For purposes of brevity, description of some elements and/or processes of embodiments discussed further below are omitted in this discussion of FIG. 1. System 100 can include first routing device 150A, second routing device 150B, third routing device 150C, and fourth routing device 150D, interconnected via network 190. As depicted, first selection process 106 can be used to select third routing device 150C, and second selection process 107 can be used to select fourth routing device 150D. As depicted, communication 195 can be received by first routing device 150A, from second routing device 150B.

First routing device 150A can include computer-executable components 120, processor 160, storage 170, network interface component 155, and memory 165. Memory 165 can include routing table 175 and queue 140. Computer-executable components 120 can include queue monitoring component 125, queueing component 126, queue bypassing component 128, threshold selecting component 127, routing component 129, and other computer-executable components 120 that can be used to implement aspects of system 100, as described herein.

In some embodiments, memory 165 can comprise volatile memory (e.g., random access memory (RAM), static RAM (SRAM), dynamic RAM (DRAM), etc.) that can employ one or more memory architectures. Further examples of memory 165 are described below with reference to system memory 1006 of FIG. 10 discussed below. In some embodiments, storage 170 can comprise non-volatile memory (e.g., read only memory (ROM), programmable ROM (PROM), electrically programmable ROM (EPROM), electrically erasable programmable ROM (EEPROM), etc.) that can employ one or more storage architectures. Such examples of memory 165 and storage 170 can be employed to implement any embodiments of the subject disclosure described or suggested by disclosures herein.

According to multiple embodiments, network 190 can comprise, but are not limited to, wired and wireless networks, including, but not limited to, a cellular network, a wide area network (WAN) (e.g., the Internet) or a local area network (LAN). For example, system 100 can communicate with one or more external systems, sources, and/or devices, for instance, computing devices (and vice versa) using virtually any desired wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol, and/or other proprietary and non-proprietary communication protocols.

According to multiple embodiments, processor 160 can comprise one or more processors and/or electronic circuitry that can implement one or more computer and/or machine readable, writable, and/or executable components and/or instructions that can be stored using memory 165 and storage 170. For example, processor 160 can perform various operations that can be specified by such computer and/or machine readable, writable, and/or executable components and/or instructions including, but not limited to, logic, control, input/output (I/O), arithmetic, and/or the like. In some embodiments, processor 160 can comprise one or more central processing unit, multi-core processor, microprocessor, dual microprocessors, microcontroller, System on a Chip (SOC), array processor, vector processor, and/or another type of processor. Further examples of processor 160 are described below with reference to processor 902 of FIG. 9 below, and processing unit 1004 of FIG. 10 discussed below. Such examples of processor 160 can be employed to implement any embodiments of the subject disclosure.

According to multiple embodiments, first routing device 150A can include memory 165 that can store one or more computer and/or machine readable, writable, and/or executable components and/or instructions 120 that, when respectively executed by processor 160, can facilitate performance of operations defined by the executable component(s) and/or instruction(s). For example, memory 165 and storage 170 can store computer and/or machine readable, writable, and/or executable components 120 and/or instructions that, when executed by processor 160, can facilitate execution of the various functions described herein relating to first routing device 150A. As depicted, first routing device 150A includes computer-executable components 120 that can comprise Computer-executable components 120 can include queue monitoring component 125, queueing component 126, queue bypassing component 128, threshold selecting component 127, routing component 129, and other computer-executable components 120 that can be used to implement aspects of system 100, as described herein. Each of these components are described in detail, with one or more embodiments described below.

Generally, applications (e.g., computer-executable components 120) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, handheld computing devices, microprocessor-based or programmable consumer electronics, and the like, each of which can be operatively coupled to one or more associated devices It should be appreciated that the embodiments of the subject disclosure depicted in various figures disclosed herein are for illustration only, and as such, the architecture of such embodiments are not limited to the systems, devices, and/or components depicted therein. For example, in some embodiments, first routing device 150A can further comprise various computer and/or computing-based elements described herein with reference to operating environment 1000 and FIG. 10. In one or more embodiments, such computer and/or computing-based elements can be used in connection with implementing one or more of the systems, devices, components, and/or computer-implemented operations shown and described in connection with FIG. 1 or other figures disclosed herein.

As described further below, in one or more embodiments, memory 165 can store executable instructions that, when executed by the processor can facilitate performance of operations that can implement one or more embodiments described herein. For example, in one or more embodiments, the operations can implement network interface component 155 that can facilitate receiving, from second routing device 150B via a network 190, a communication 195. The operations can further implement queueing component 126 that can, in response to a number of communications 195 in queue 140 being determined to be less than a threshold, queueing, in the queue, the communication for a third routing device selected according to a first selection process as being on a route to a destination routing device for the communication. In one or more embodiments, the operations can further comprise threshold selecting component 127 that can select the threshold to reduce a queueing delay associated with the queue 140. In one or more embodiments, the operations can further implement threshold selecting component 127 that can select the threshold to reduce a queueing delay associated with the queue 140. In one or more embodiments, the operations can further implement queue monitoring component 125 that can determine that the number of communications 195 in queue 140 is less than the threshold.

In one or more embodiments, the operations can further implement queue bypassing component 128 that can, in response to the queueing delay of the queue being determined to be equal to or above the threshold (e.g., by queue monitoring component 125), transmitting the communication 195 to fourth routing device 150D (e.g., by network interface 155). In one or more embodiments, fourth routing device 150D can be selected according to a second selection process different than the first selection process, e.g., performed by routing component 129. In one or more embodiments, queueing component 126 can queue communication 195 in queue 140 for transmission, by network interface component 155, to third routing device 150C.

Expanding on the second selection process, in one or more embodiments, queue bypassing component 128 can utilize second selection process to select fourth routing device 150D without reference to a destination address of the destination routing device. Expanding on the first selection process, in one or more embodiments, routing component 129 can determine a destination address for the destination routing device of communication 195 and use routing table 175 to select a route to the destination routing device. In one or more embodiments, the second selection process discussed above for selecting fourth routing device 150D, e.g., by queue bypassing component 125. Further, in one or more embodiments, queue bypassing component 125 can use the second selection process to select fourth routing device 150D based on a previously received communication. For example, when a previously received communication is transmitted to fourth routing device 150D, this selection can be used to select the same fourth routing device 150D as was selected (e.g., by first selection process, considering routing table 175) by routing component 129.

In one or more embodiments, network 190 and other networks described herein comprise aspects of a packet-switched network, and communication 195 can comprise a packet. As would be appreciated by one having skill in the relevant art(s), in some embodiments the packet communication 195 can comprise a header portion and a data portion, with the header portion comprising a destination address of the destination routing device. In this example implementation, queue bypassing component 128, and the example second process for selecting fourth routing device 150D, can operate without reference to the header portion of packet communication 195, e.g., the destination address noted above.

It should be noted that, in one or more embodiments, system 100 and other embodiments described herein can employ hardware and/or software to solve problems that are highly technical in nature, including improving the routing of communications over a multi-node network 190, handling large amounts of route update information, and rapidly rerouting communications in response to changing network 190 conditions, including processes to exchange and analyze network information across network 190, and to expand the time a quantum computer can execute quantum operations. One having skill in the relevant art(s), given the disclosure herein, would appreciate that the technical problems that can be solved by one or more embodiments described herein are not abstract and cannot be performed as a set of mental acts by a human.

Further, in certain embodiments, some of the processes performed can be performed by one or more specialized computers (e.g., one or more specialized processing units, a specialized computer such as tomography and reconstruction, statistical estimation, specialized routing analysis, and so on) for carrying out defined tasks related to selectively bypassing a routing queue 140 in first routing device 150A. System 100 and/or components of the system can be employed to solve new problems that arise through advancements in technologies mentioned above, computer architecture, and/or the like.

Figure 2:
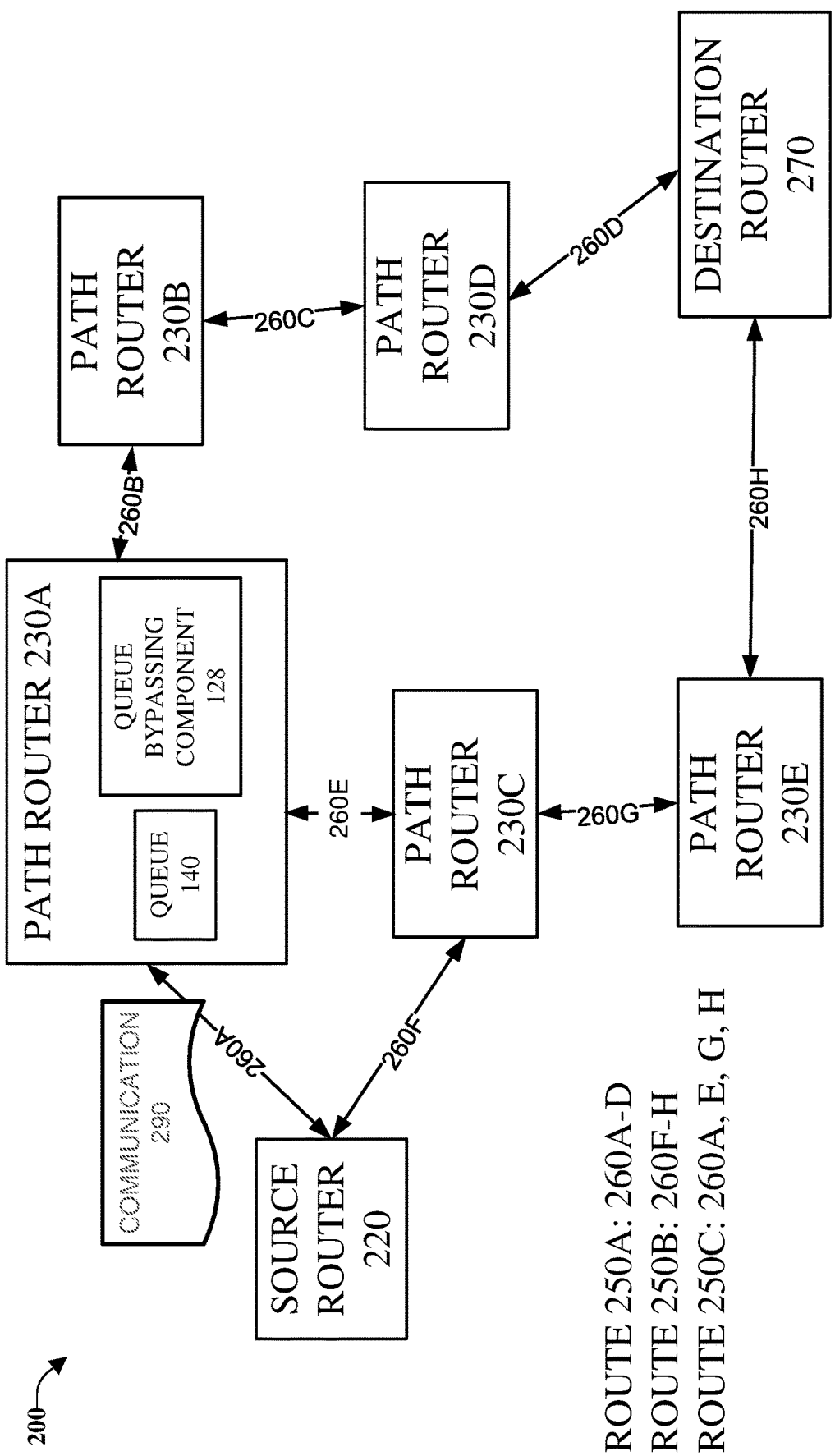
FIGS. 2-3 illustrate an example network where one or more of the concepts described herein for routing communications can be performed.
Figure 3:
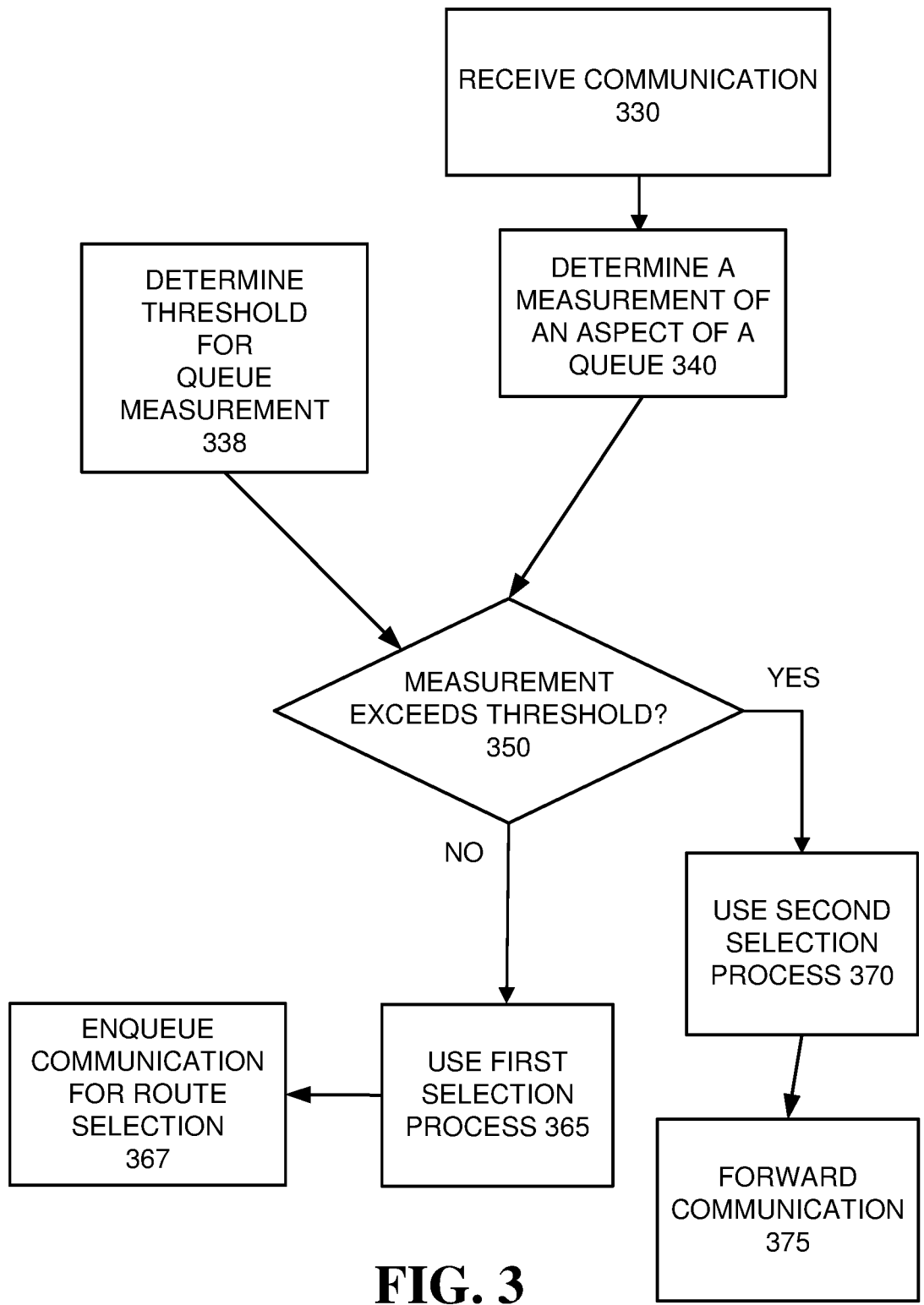

FIGS. 2-3 illustrate an example network 200 where one or more of the concepts described herein for routing communications can be performed. Flow diagram 300 of FIG. 3 references the network of FIG. 2 to described different processes utilized by one or more embodiments. Specifically, FIG. 2 illustrates an example node diagram of a network 190 with components that can implement system 200 to facilitate selectively bypassing a routing queue in a routing device, in accordance with one or more embodiments. For purposes of brevity, description of like elements and/or processes employed in other embodiments is omitted. Network 200 includes source router 220, destination router 270, routers 230A-230E, and links 260A-H between variously depicted routers. One having skill in the relevant art(s), given the description herein will appreciate that FIG. 2 depicts elements of network routing example. In this example, packets traveling from source router 220 to destination router 270 pass through combinations of ones of routers 230A-230E along a route. Path router 230A includes queue 140, and other routers 220, 270, and 230B-E depicted can include queues 140 as well. Example routes 250A-C are listed on FIG. 2, and include example routes from source router 220 to destination router 270.

In one or more embodiments, network 190 and the connected components depicted therein can implement a relativistic routing network, where extra processing power can be deployed a routing devices to collect, process, and widely share routing information across the network. In this example, the widely sharing of routing updates can utilize a flooding control protocol to share routing updates among routing devices, with receiving devices potentially flooding other connected routing devices with received routing updates.

In this example, in part because of rapid and widely shared routing updates, routing table 175 can be updated up to, and in some circumstances exceeding, 500,000 times per second, utilizing, by some estimations, processing capability of over a $100 \times 10^{12}$ floating point operations per second (100 teraFLOPS). With this example scale, even powerful Central Processing Unit (CPU) processors 160 can be overwhelmed. One approach that can be employed by one or more embodiments is to have specialized processing resources dedicated to processing route updates specialized routing processors, or other repurposing other types of processors from one use to a use processing route updates, e.g., a Graphical Processing Unit (GPU) can be configured to handle the rapid and extensive route update processing of this example.

One having skill in the relevant art(s), given the disclosure herein will appreciate that because, in one or more embodiments, route updates can be flooded through the network, additional processing can be required by route selection resources when communications are processed for routing towards a destination router. It would also be appreciated that, in some circumstances, this extra processing of recent and comprehensive route information can lead to routes that can more effectively utilize network links to improve the speed of data conveyance from source node 220 to destination node 270. It would further be appreciated that in some circumstances, performing additional processing of route information, and increasing the pace of updating routing information can potentially cause queue delays while processing is performed.

As part of the relativistic routing network example, in addition to providing additional route processing resources to routing devices, to further increase the speed of traversing a routing device, one or more embodiments can limit the pausing of network communications in a queue, e.g., while processing backlogs are handed. In one or more embodiments, by rapidly forwarding network communications to other routing devices when queue delays exceed a relatively low threshold, e.g., in the example implementation maximum queue delays before forwarding can be 250 µsec compared to alternate approaches, which can have example queueing delays of 150 ms (e.g., 600 times longer) before dropping a communication.

One approach to handling queue delays utilized by one or more embodiments is to selectively bypass the queue associated with processing received communications. As described in FIG. 3 below, one or more embodiments can avoid having queues be a source of delay and failed communications (e.g., dropped packets) by implementing some of the features described herein, e.g., when a characteristic of a queue exceeds a particular threshold level, immediately shifting received communications that would be placed in the queue to another routing device, with a minimum of processing.

Using network 200 as an example, FIG. 3 is a flow diagram representing example operations of an example system 300 that can facilitate improving overall network speed by bypassing queue 140 in some circumstances, in accordance with one or more embodiments. For purposes of brevity, description of like elements and/or processes employed in other embodiments is omitted.

At 330, a communication is received via a network. In one or more embodiments, a communication (e.g., a packet) is received (e.g., by second device 230A from source router 220) via a network (e.g., packet switched network 190). At 340, a measurement of an aspect of a queue is determined. In one or more embodiments, a measurement (e.g., an interval) of an aspect (e.g., queue delay) of a queue 140 is determined. In a first example, the interval measured for the queue delay of queue 140 is 200 µsec, e.g., a packet is delayed for 200 µsec in queue 140 before it is processed for routing. Additional example intervals are discussed below.

At 350, the measurement can be compared to a threshold. In one or more embodiments, the measurement (e.g., an interval of 200 µsec) is compared to a threshold. In an example implementation, an interval threshold is selected, e.g., 250 µsec, the selection of this threshold being discussed further below. Thus, in this first example, because the 200 µsec measurement is less than 250 µsec threshold, flow proceeds to block 335. At 335, a first selection process 106 can be used to select a routing device to which the communication is transmitted by source router 220. In one or more embodiments, this first selection process can be a default process for use when queue 140 is not subject to excessive delays. Thus, at 367, the communication can be enqueued in queue 140 to be processed in accordance to a standard approach for first routing source router 220.

One having skill in the relevant art(s), given the description herein, will appreciate that, in this standard approach, a header of the communication can be processed to determine a destination routing device (e.g., destination router 270) and a routing table (e.g., routing table 175) can be used to select between linked routing devices, e.g., path routers 230A and 230C linked to source router 220, with path router 230A being selected when route 250A is selected as the best route, as opposed to path router 230C being selected when route 250B is determined to be a better route. One having skill in the relevant art(s) would further appreciate that communications enqueued in queue 140 can be significantly delayed while the standard processing discussed above is performed, with this delay potentially being the most significant of the delays measured by one or more embodiments, e.g., serialization delay, propagation delay, switching delay, and queueing delay. In addition, in one or more embodiments, queue 140, being used to hold communications for processing and routing is a data transmission queue (e.g., for transmission on a data channel), and, while other queues can be used by routing devices (e.g., control queues), data transmission queues can be more significant than other types of queues.

Continuing the discussion of the flow diagram of FIG. 3, in a second example, when another communication is received, a second measurement (e.g., an interval of 300 µsec) is compared to a threshold, e.g., the 250 µsec threshold discussed above. In this example, because 300 µsec exceeds the threshold of 250 µsec, flow proceeds to block 370. At block 370, second selection process 107 can be used to select routing device to which the communication is delayed. In this approach, a routing device can be selected without one or more elements of the processing described above, e.g., the header of the communication need not be processed, routing table 175 need not be used to select a path. In one or more embodiments, by transmitting the communication without these processing steps, communication 195 need not be placed in queue 140, where backups and delay associated with this processing can occur. In one or more embodiments, other queues can be utilized by second selection process 107, but in different examples, these queues are for less time-consuming processes, e.g., transmission to the selected fourth routing device (path router 230C). It should be noted that, as a part of the relativistic routing network example discussed above, when the communication is received by path router 23C, queue delay threshold analysis can also be performed at this router, with communications again being rapidly forwarded to another routing device, if a processing queue of path router 230C exceeds a threshold, e.g., either the same threshold described above (e.g., 250 μsec) or a different selected threshold, depending on implementation specifics.

Returning to the selection of fourth routing device path router 230C by second selection process 107, in one or more embodiments, path router 230C can be selected by a variety of approaches that can require less processing, e.g., use of a previously selected routing device, use of a routing process requiring less time. In one or more embodiments, the detriments of not performing full processing and routing of a communication can be considered in view of the benefits from rapidly forwarding communications to other routing devices to avoid queueing delays.

In one or more embodiments, at block 338, the queueing delay threshold can be selected based on different implementation details of system 300. For example, some complex networks may see higher penalties for not using routing tables, such that one or more embodiments can increase the threshold interval allow for additional facilitating of routing processes, e.g., with a potential increase in queueing delays for queue 140. In some examples however, with a particular threshold setting, any increases in queueing delay can be offset by increases in routing accuracy.

Figure 4:
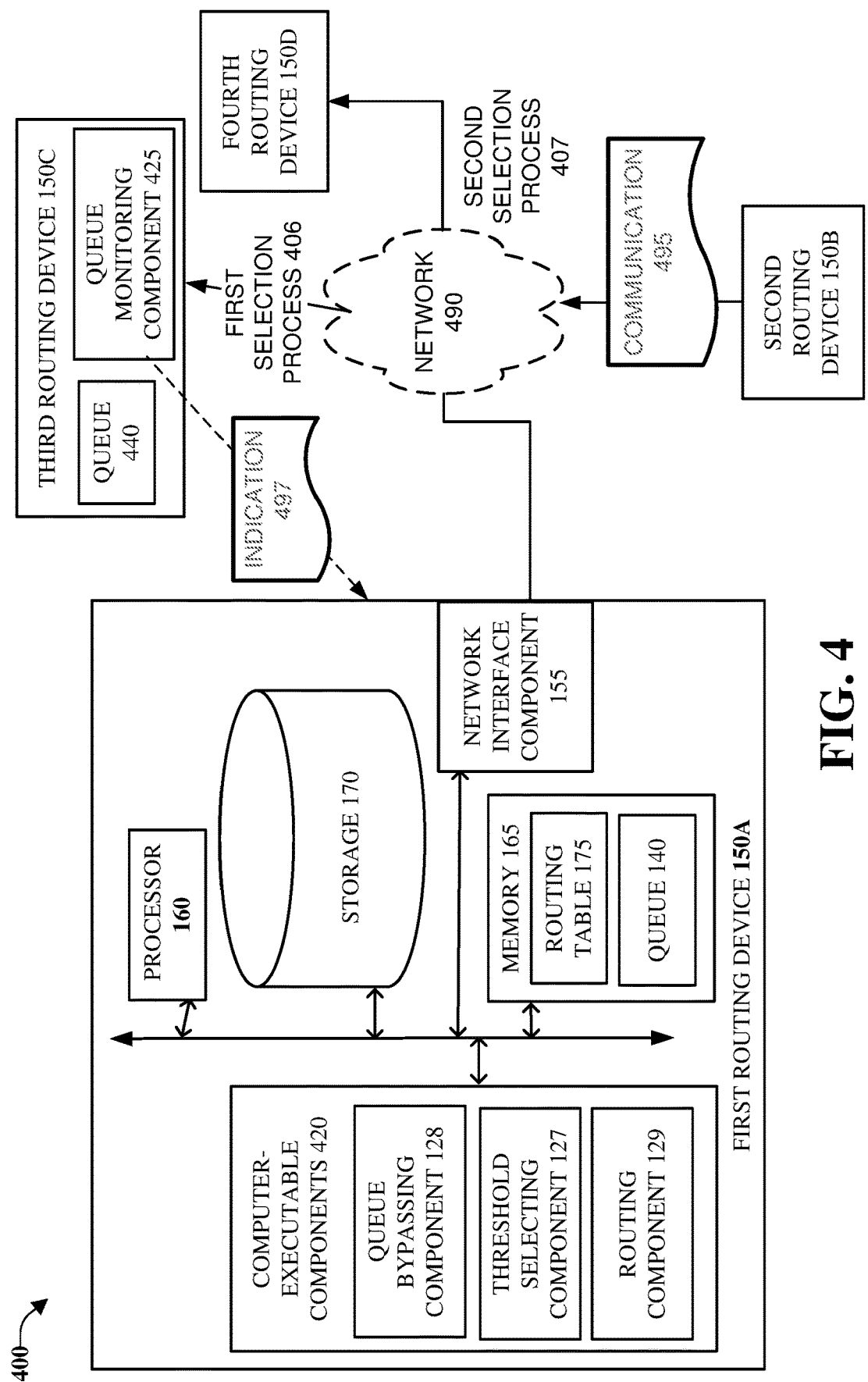
FIGS. 4-5 provide an example network environment for operation of one or more embodiments.
Figure 5:
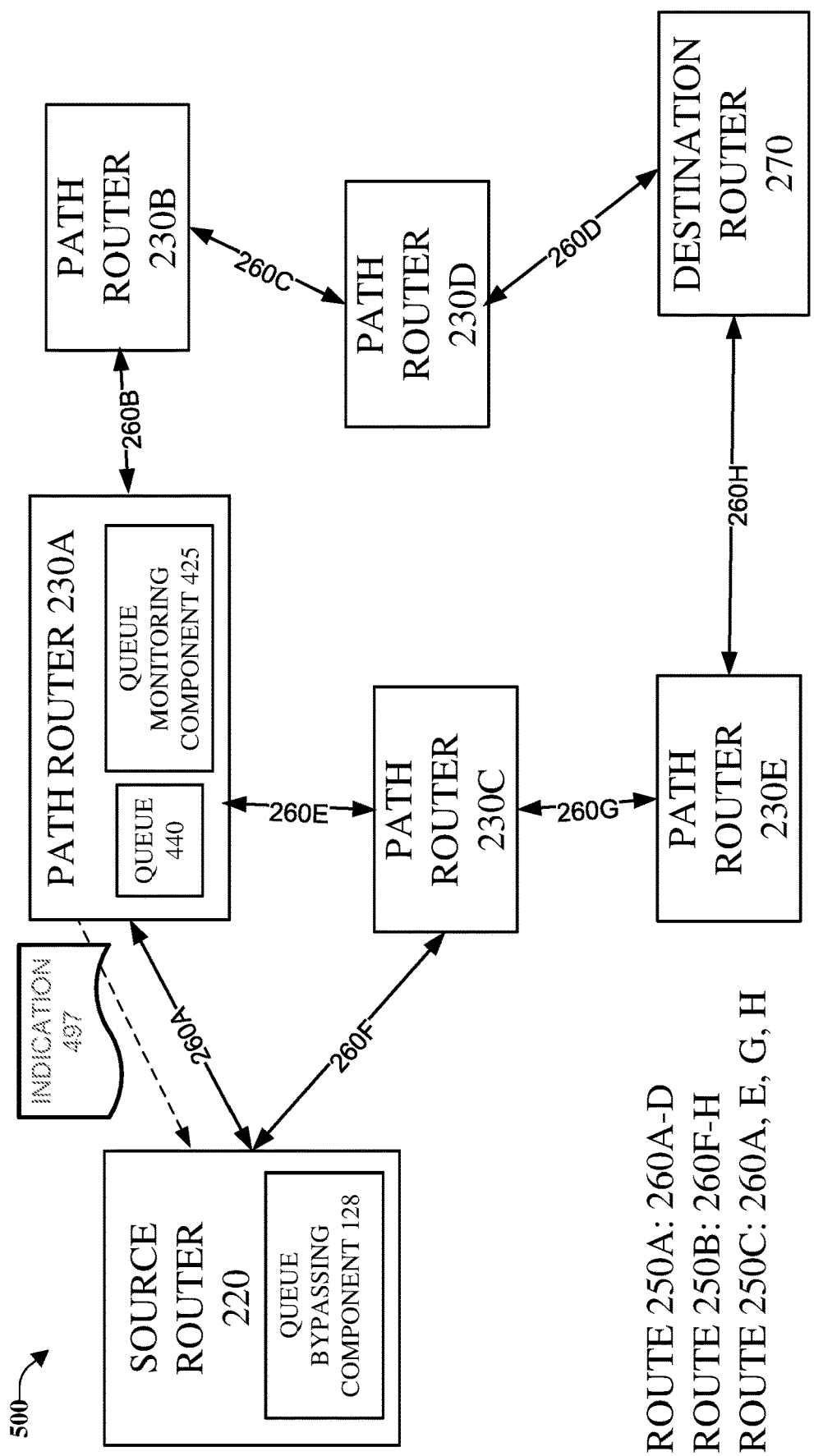
Figure 6:
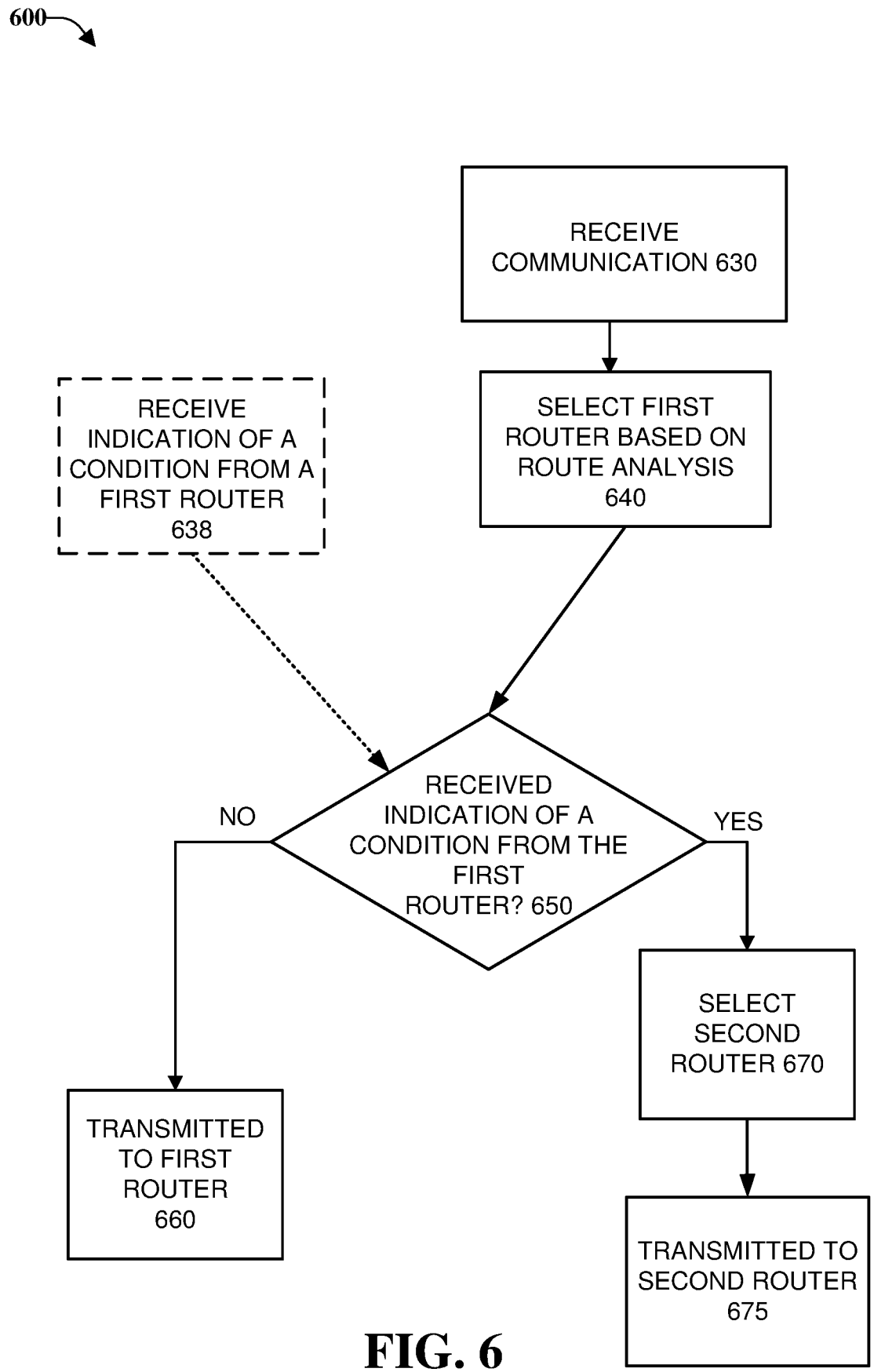
FIG. 6 provides flow diagram that references the network of FIG. 5 to describe different processes utilized by one or more embodiments.

FIGS. 4-6 illustrate an example network where an alternative system 400 to the approaches described with FIGS. 1-3 is described. Specifically, FIGS. 4-5 provide an example network environment for operation of one or more embodiments, and FIG. 6 provides flow diagram 600 that references the network of FIG. 5 to describe different processes utilized by one or more embodiments.

As discussed below, example system 400 can facilitate selectively bypassing a routing queue in a routing device, in accordance with one or more embodiments. For purposes of brevity, description of some elements and/or processes of embodiments discussed further below are omitted in this discussion of FIG. 1. System 400 can include first routing device 150A, second routing device 150B, third routing device 150C, and fourth routing device 150D, interconnected via network 190. Third routing device 150C can include queue 440 and queue monitoring component. As depicted, first selection process 406 can be used to select third routing device 150C, and second selection process 407 can be used to select fourth routing device 150D. As depicted, communication 495 can be received by first routing device 150A, from second routing device 150B.

First routing device 150A can include computer-executable components 120, processor 160, storage 170, network interface component 155, and memory 165. Memory 165 can include routing table 175 and queue 140. Computer-executable components 120 can include queue bypassing component 128, threshold selecting component 127, routing component 129, and other computer-executable components 120 that can be used to implement aspects of system 100, as described herein.

Generally speaking, as noted above, FIGS. 4-6 depict alternative embodiments to the queue bypassing approach described above with FIGS. 1-3. In the previously described approach, communications were received by a path router 230A from source router 220, and based on queue delays an internal queue 140 could be used to hold communications for time-consuming routing analysis, or alternatively, when queue delays exceeded a threshold, the internal queue 140 could be bypassed and a received communication could be forwarded to another routing device, potentially on a different route than was originally selected. For example, in FIG. 2, based on queue delays in queue 140, queue bypassing component can bypass queue 140 and transmit the communication to a selected path router, e.g., path router 230C on route 250C. In this example, if the communication had been processed (e.g., utilizing routing table 175), path router 230B is selected, with route 250A being a route preferable to route 250C. However, by using second selection process 107, the queueing delays of path router 230A were avoided, and this time offset the slower route 250C, such that this route had a higher speed than route 250A. One having skill in the relevant art(s), given the description herein, would appreciate that different implementations can have different results, e.g., based on the threshold interval selected, the complexity of the paths 250A-C available, and processing power of routing devices 230A-E.

In contrast to this approach, as depicted in FIG. 4, the selection processes 106-107 can be performed by first routing device 150A before relaying the communication to either third routing device 150C or fourth routing device 150D. In this example, like the example above, queue monitoring component 425 of third routing device 150C can determine a measurement (e.g., time intervals) of a queue delay of queue 440 of third routing device 150C. When these measurements exceed the threshold interval set, an indication 497 of this event can be relayed to first routing device 150A, where, as described further below, indication 497 can determine which of first selection process 106 and second selection process 107 is used to select a router to which the communication is routed.

FIG. 5 returns to a depiction of network 200 of FIG. 2 above to illustrate aspects of the alternative embodiments described above, in accordance with one or more embodiments. For purposes of brevity, description of like elements and/or processes employed in other embodiments is omitted. Network 500 includes source router 220, destination router 270, routers 230A-230E, and links 260A-H between variously depicted routers. Path router 230A can include queue 140 and queue monitoring component 425, and other routers 220, 270, and 230B-E depicted can include these components as well. Example routes 250A-C are listed on FIG. 2, and include example routes from source router 220 to destination router 270. Source router can include queue bypassing component 128, and path router 230A can include queue 440 and queue monitoring component. With respect to queue bypassing component 128, as described further below, it should be appreciated that, in contrast to the example of FIG. 2, where this component of first routing device 150A could bypass queue 140 in the first routing device 150A, in FIG. 5, queue bypassing component 128 can, when conditions are met, additionally or alternatively bypass queue 440 of path router 230A, e.g., by routing the communication to path router 230C instead of path router 230A.

FIG. 6 is a flow diagram representing example operations of an example system 600 to route communications in network 500, described above. For purposes of brevity, description of like elements and/or processes employed in other embodiments is omitted. At 630, a communication 495 can be received by source router 220 from another routing device (not shown). At 640, a first router can be selected based on an analysis of possible routes to a destination router of the received communication. This analysis, as described above, can utilize a header of the communication to determine the destination, and routing table 175 of source router 220 to facilitate the selection from routes 250A-C. In this example, based on this analysis, path router 230A is selected by first selection process 406. At 650, it is determined whether indication 497 has been received from the selected path router 230A. In one or more embodiments, indication 497 is a signal from a routing device that a queue of the device currently has a queue delay that exceeds a selected threshold value, e.g., the queue delay is labeled as excessive.

At 670, based on this determination that the selected path router 230A has a queue delay that is labeled as excessive, second selection process 407 can be used to select an alternate router for transmission of communication 495, e.g., path router 230C on alternate path 250C. It should be noted that, in addition to the approaches described with the description of second selection process 107 of FIG. 1 (e.g., preselected, or based on prior used routing devices, where the selection can be performed quickly), second selection procedure 407 can perform different types of analysis, including the use of routing table 175, and aspects of the selection process of first selection process 406. In additional embodiments, during first selection process 406, additional routing devices can be selected, so as to facilitate rapid switching between the first selected routing device and, an alternative device selected based on the excessive queue delays in the first selected device. At 675, communication 495 can be transmitted to the selected alternative, second router, path router 230C.

Returning to 650, when an indication 497 has not been received from the first selected router, flow passes to 660, where communication 495 can be transmitted to the first selected router, where communication 495 can be received and queued in queue 440 for processing, e.g., without excessive queue delay.

Figure 7:
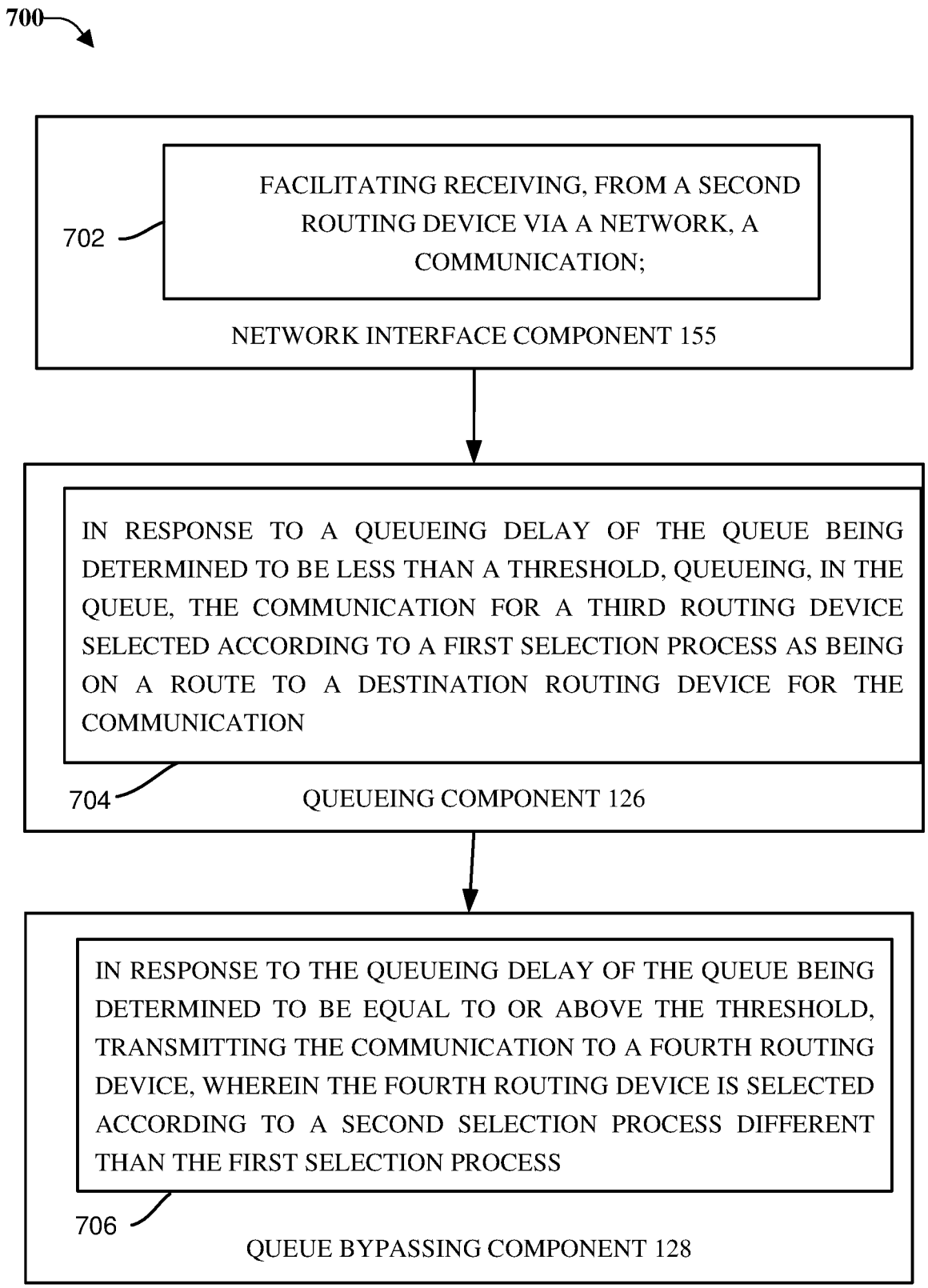
FIG. 7 is a flow diagram representing example operations of an example system comprising a network interface component, queueing component, and queue bypassing component, and other computer-executable components that can be used to implement aspects of system, in accordance with one or more embodiments.

FIG. 7 is a flow diagram representing example operations of an example system 700 comprising a network interface component 155, queueing component 126, and queue bypassing component 128, and other computer-executable components 120 that can be used to implement aspects of system 100, in accordance with one or more embodiments.

Network interface component 155 can be configured 702 to facilitate receiving, from a second routing device via a network, a communication. For example, in one or more embodiments, Network interface component 155 can be configured 702 to facilitate receiving, from a second routing device (e.g., source routing device 220) via network 190, a communication 195. Queueing component 126 can be configured to, in response to a queueing delay of the queue being determined to be less than a threshold, queueing, in the queue, the communication for a third routing device selected according to a first selection process as being on a route to a destination routing device for the communication. For example, in one or more embodiments, queueing component 126 can be configured to, in response to a queueing delay of the queue being determined to be less than a threshold (e.g., by queue monitoring component 125), in queue 140, the communication 195 for a third routing device (e.g., path router 230B) selected according to a first selection process as being on a route 250A to destination router 270 for communication 195.

Continuing this example, in one or more embodiments, queue bypassing component 128 can be configured to, in response to the queueing delay of the queue being determined to be equal to or above the threshold, transmitting the communication to a fourth routing device, wherein the fourth routing device is selected according to a second selection process different than the first selection process. For example, in one or more embodiments, queue bypassing component 128 can be configured to, in response to the queueing delay of the queue 150 being determined to be equal to or above the threshold (e.g., 250 μsec), transmitting the communication to a fourth routing device (e.g., path router 230C), wherein the fourth routing device is selected according to a second selection process 107 different than the first selection process 106.

Figure 8:
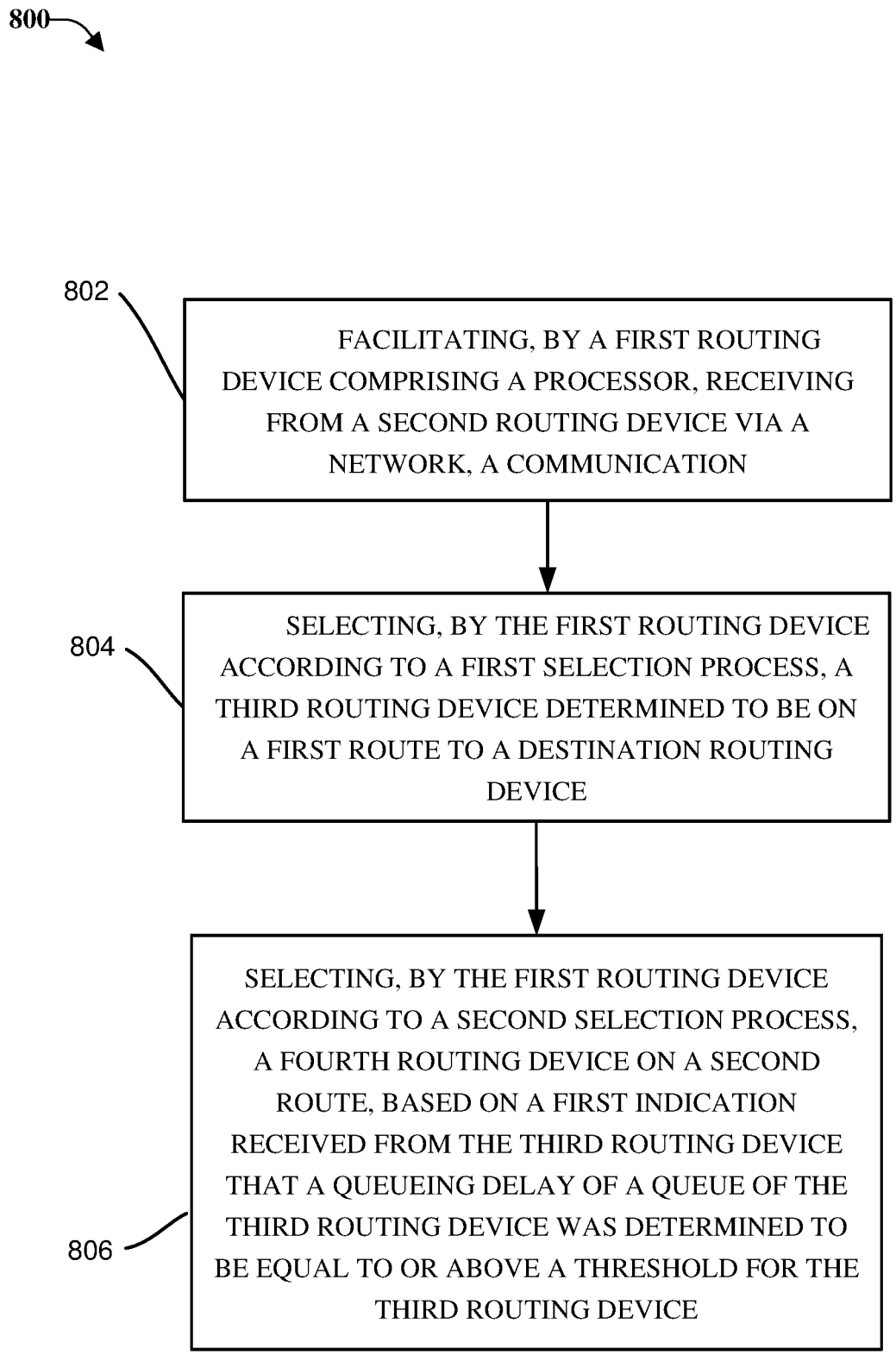
FIG. 8 illustrates a flow diagram of an example method that can facilitate selectively bypassing a routing queue in a routing device, in accordance with one or more embodiments.

FIG. 8 illustrates a flow diagram of an example method 800 that can facilitate selectively bypassing a routing queue in a routing device, in accordance with one or more embodiments. For purposes of brevity, description of like elements and/or processes employed in other embodiments is omitted.

At 802, method 800 can comprise facilitating, by a first routing device comprising a processor, receiving from a second routing device via a network, a communication. For example, in one or more embodiments, a method can comprise facilitating, by source router 220, comprising a processor 160, receiving from a second routing device 150B via a network 190, a communication 195. At 804, method 800 can further comprise selecting, by the first routing device, according to a first selection process, a third routing device determined to be on a first route to a destination routing device. For example, in one or more embodiments, the method can further comprise selecting, by the source router 220 according to a first selection process 106, path router 230A determined to be on a first route 250A to a destination routing device 270.

At 806, method 800 can further comprise selecting, by the first routing device according to a second selection process, a fourth routing device on a second route, based on a first indication received from the third routing device that a queueing delay of a queue of the third routing device was determined to be equal to or above a threshold for the third routing device. For example, in one or more embodiments, the method can further comprise selecting, by source router 220, according to a second selection process 107, path router 230C on a second route 250C, based on a first indication 497 received from path router 230A that a queueing delay of a queue 440 of path router 230A was determined to be equal to or above a threshold for path router 230A.

Figure 9:
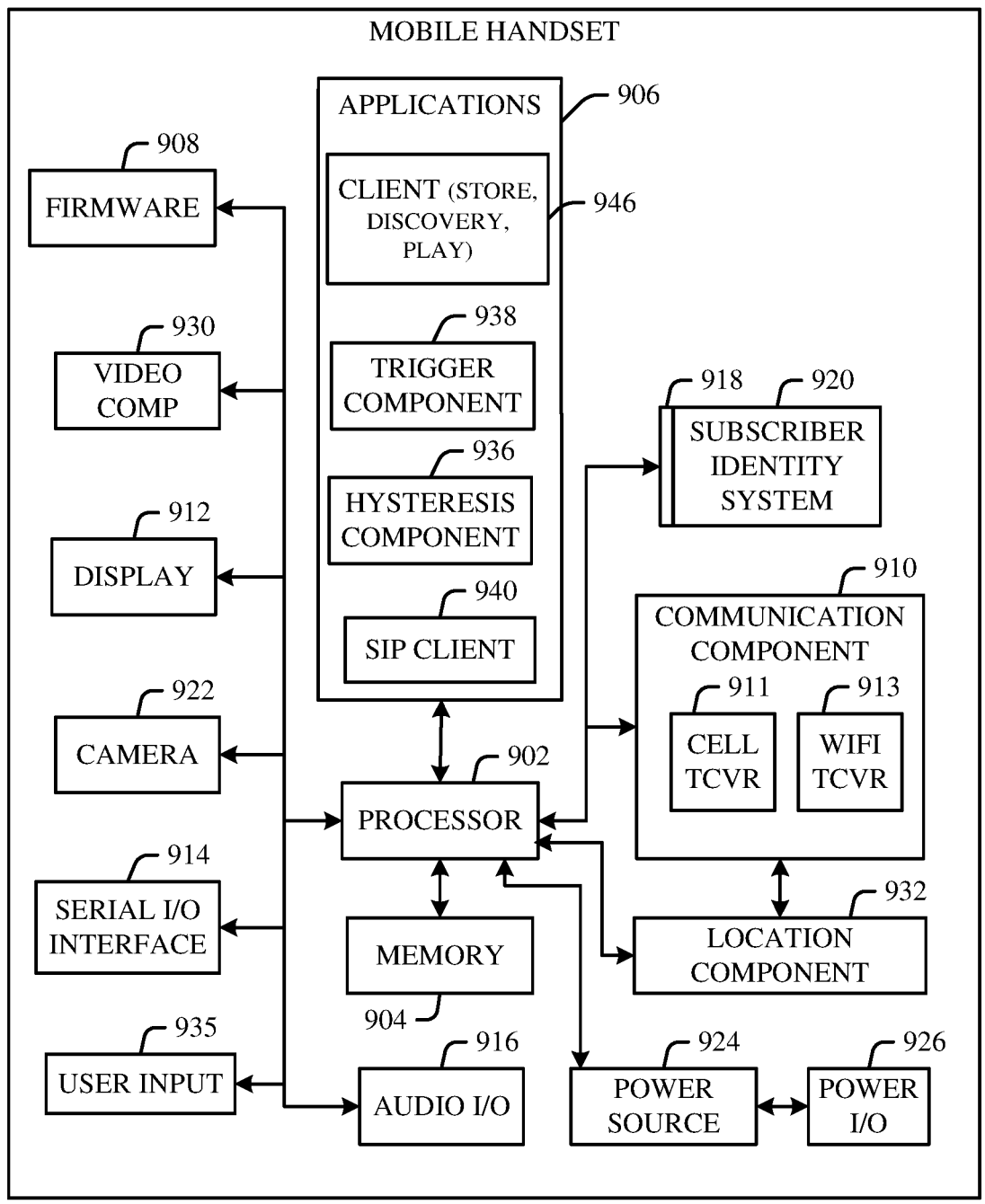
FIG. 9 illustrates an example block diagram of a mobile handset operable to engage in a system architecture that facilitates wireless communications according to one or more embodiments described herein.

FIG. 9 illustrates an example block diagram of a mobile handset 900 operable to engage in a system architecture that facilitates wireless communications according to one or more embodiments described herein. For purposes of brevity, description of like elements and/or processes employed in other embodiments is omitted.

Although a mobile handset is illustrated herein, it will be understood that other devices can be a mobile device, and that the mobile handset is merely illustrated to provide context for the embodiments of the various embodiments described herein. The following discussion is intended to provide a brief, general description of an example of a suitable environment in which the various embodiments can be implemented. While the description includes a general context of computer-executable instructions embodied on a machine-readable storage medium, those skilled in the art will recognize that the embodiments also can be implemented in combination with other program modules and/or as a combination of hardware and software.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules, or other data. Computer storage media can include, but is not limited to, RAM, ROM, EEPROM, flash memory or other memory technology, solid state drive (SSD) or other solid-state storage technology, Compact Disk Read Only Memory (CD ROM), digital video disk (DVD), Blu-ray disk, or other optical disk storage, magnetic cassettes, magnetic tape, magnetic disk storage or other magnetic storage devices, or any other medium which can be used to store the desired information and which can be accessed by the computer. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Communication media typically embodies computer-readable instructions, data structures, program modules, or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media The handset includes a processor 902 for controlling and processing all onboard operations and functions. A memory 904 interfaces to the processor 902 for storage of data and one or more applications 906 (e.g., a video player software, user feedback component software, etc.). Other applications can include voice recognition of predetermined voice commands that facilitate initiation of the user feedback signals. The applications 906 can be stored in the memory 904 and/or in a firmware 908, and executed by the processor 902 from either or both the memory 904 or/and the firmware 908. The firmware 908 can also store startup code for execution in initializing the handset 900. A communications component 910 interfaces to the processor 902 to facilitate wired/wireless communication with external systems, e.g., cellular networks, VoIP networks, and so on. Here, the communications component 910 can also include a suitable cellular transceiver 911 (e.g., a GSM transceiver) and/or an unlicensed transceiver 913 (e.g., Wi-Fi, WiMax) for corresponding signal communications. The handset 900 can be a device such as a cellular telephone, a PDA with mobile communications capabilities, and messaging-centric devices. The communications component 910 also facilitates communications reception from terrestrial radio networks (e.g., broadcast), digital satellite radio networks, and Internet-based radio services networks.

The handset 900 includes a display 912 for displaying text, images, video, telephony functions (e.g., a Caller ID function), setup functions, and for user input. For example, the display 912 can also be referred to as a "screen" that can accommodate the presentation of multimedia content (e.g., music metadata, messages, wallpaper, graphics, etc.). The display 912 can also display videos and can facilitate the generation, editing and sharing of video quotes. A serial I/O interface 914 is provided in communication with the processor 902 to facilitate wired and/or wireless serial communications (e.g., USB, and/or IEEE 1294) through a hardwire connection, and other serial input devices (e.g., a keyboard, keypad, and mouse). This supports updating and troubleshooting the handset 900, for example. Audio capabilities are provided with an audio I/O component 916, which can include a speaker for the output of audio signals related to, for example, indication that the user pressed the proper key or key combination to initiate the user feedback signal. The audio I/O component 916 also facilitates the input of audio signals through a microphone to record data and/or telephony voice data, and for inputting voice signals for telephone conversations.

The handset 900 can include a slot interface 918 for accommodating a SIC (Subscriber Identity Component) in the form factor of a card Subscriber Identity Module (SIM) or universal SIM 920, and interfacing the SIM card 920 with the processor 902. However, it is to be appreciated that the SIM card 920 can be manufactured into the handset 900, and updated by downloading data and software.

The handset 900 can process IP data traffic through the communications component 910 to accommodate IP traffic from an IP network such as, for example, the Internet, a corporate intranet, a home network, a person area network, etc., through an ISP or broadband cable provider. Thus, VoIP traffic can be utilized by the handset 900 and IP-based multimedia content can be received in either an encoded or a decoded format.

A video processing component 922 (e.g., a camera) can be provided for decoding encoded multimedia content. The video processing component 922 can aid in facilitating the generation, editing, and sharing of video quotes. The handset 900 also includes a power source 924 in the form of batteries and/or an AC power subsystem, which power source 924 can interface to an external power system or charging equipment (not shown) by a power I/O component 926.

The handset 900 can also include a video component 930 for processing video content received and, for recording and transmitting video content. For example, the video component 930 can facilitate the generation, editing and sharing of video quotes. A location tracking component 932 facilitates geographically locating the handset 900. As described hereinabove, this can occur when the user initiates the feedback signal automatically or manually. A user input component 934 facilitates the user initiating the quality feedback signal. The user input component 934 can also facilitate the generation, editing and sharing of video quotes. The user input component 934 can include such conventional input device technologies such as a keypad, keyboard, mouse, stylus pen, and/or touch screen, for example.

Referring again to the applications 906, a hysteresis component 936 facilitates the analysis and processing of hysteresis data, which is utilized to determine when to associate with the access point. A software trigger component 938 can be provided that facilitates triggering of the hysteresis component 936 when the Wi-Fi transceiver 913 detects the beacon of the access point. A SIP client 940 enables the handset 900 to support SIP protocols and register the subscriber with the SIP registrar server. The applications 906 can also include a client 942 that provides at least the capability of discovery, play and store of multimedia content, for example, music.

The handset 900, as indicated above related to the communications component 910, includes an indoor network radio transceiver 913 (e.g., Wi-Fi transceiver). This function supports the indoor radio link, such as IEEE 802.11, for the dual-mode GSM handset 900. The handset 900 can accommodate at least satellite radio services through a handset that can combine wireless voice and digital radio chipsets into a single handheld device.

One or more devices described herein can be connected to one or more communication service provider networks via one or more backhaul links or the like (not shown). For example, the one or more backhaul links can comprise wired link components, such as a T1/E1 phone line, a digital subscriber line (DSL) (e.g., either synchronous or asynchronous), an asymmetric DSL (ADSL), an optical fiber backbone, a coaxial cable, and the like.

It should be understood that any of the examples and terms used herein are non-limiting. For instance, while examples are generally directed to non-standalone operation where the NR backhaul links are operating on mmWave bands and the control plane links are operating on sub-6 GHz LTE bands, it should be understood that it is straightforward to extend the technology described herein to scenarios in which the sub-6 GHz anchor carrier providing control plane functionality could also be based on NR. As such, any of the examples herein are non-limiting examples, any of the embodiments, aspects, concepts, structures, functionalities or examples described herein are non-limiting, and the technology may be used in various ways that provide benefits and advantages in radio communications in general.

One or more embodiments can employ various cellular systems, technologies, and modulation schemes to facilitate wireless radio communications between devices. While example embodiments include use of 5G new radio (NR) systems, one or more embodiments discussed herein can be applicable to any radio access technology (RAT) or multi-RAT system, including where different user equipment operate using multiple carriers, e.g. LTE FDD/TDD, GSM/GERAN, CDMA2000, etc. For example, a wireless communication system can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the user equipment. The term carrier aggregation (CA) is also called (e.g. interchangeably called) "multi-carrier system", "multi-cell operation", "multi-carrier operation", "multi-carrier" transmission and/or reception. Note that some embodiments can also applicable for Multi RAB (radio bearers) on some carriers (that is data plus speech is simultaneously scheduled).

In various embodiments, the system 100 can be configured to provide and employ 5G wireless networking features and functionalities. With 5G networks that may use waveforms that split the bandwidth into several sub bands, different types of services can be accommodated in different sub bands with the most suitable waveform and numerology, leading to improved spectrum utilization for 5G networks. Notwithstanding, in the mmWave spectrum, the millimeter waves have shorter wavelengths relative to other communications waves, whereby mmWave signals can experience severe path loss, penetration loss, and fading. However, the shorter wavelength at mmWave frequencies also allows more antennas to be packed in the same physical dimension, which allows for large-scale spatial multiplexing and highly directional beamforming.

Figure 10:
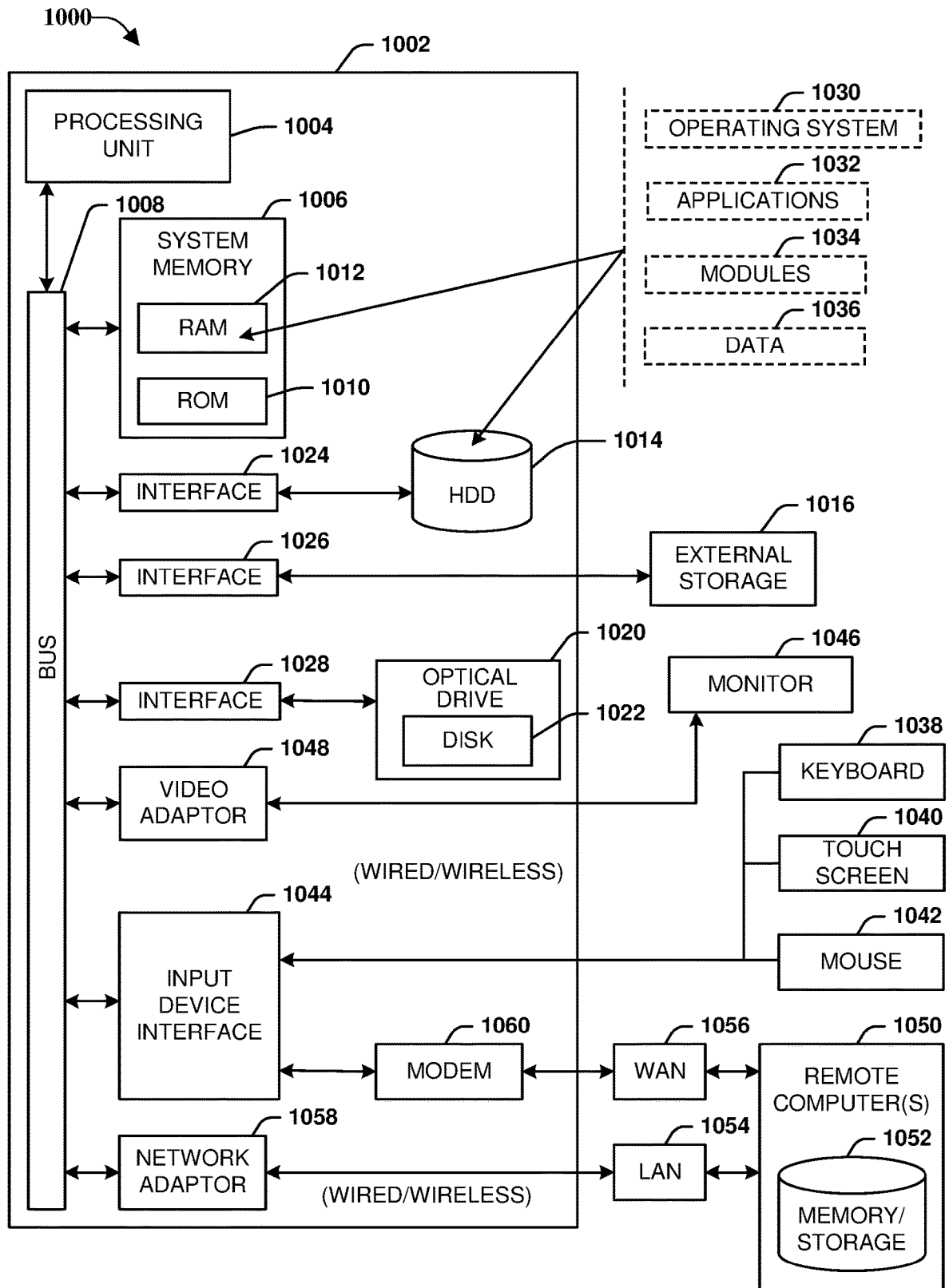
FIG. 10 and the following discussion are intended to provide a brief, general description of a suitable computing environment 1000 in which the various embodiments of the embodiment described herein can be implemented.

Referring now to FIG. 10, in order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software. For purposes of brevity, description of like elements and/or processes employed in other embodiments is omitted.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.).

While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance, with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "network device," "access point (AP)," "base station," "NodeB," "evolved Node B (eNodeB)," "home Node B (HNB)," "home access point (HAP)," "cell device," "sector," "cell," and the like, are utilized interchangeably in the subject application, and refer to a wireless network component or appliance that can serve and receive data, control, voice, video, sound, gaming, or substantially any data-stream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the embodiments are not to be limited to any single implementation, but rather is to be construed in breadth, spirit and scope in accordance with the appended claims.

What is claimed is:

1. A method, comprising,
in response to a queueing delay of a queue being determined to be less than a threshold delay, queueing, by first routing equipment comprising a processor, in the queue, a communication for second routing equipment selected according to a first selection process as being on a route to destination routing equipment for the communication; and
in response to the queueing delay of the queue being determined not to be less than the threshold delay, transmitting, by the first routing equipment, the communication to third routing equipment selected according to a second selection process different than the first selection process, wherein the third routing equipment is selected according to the second selection process without processing a header portion of the communication.

2. The method of claim 1, wherein the header portion of the communication comprises a destination address of the destination routing equipment, and wherein the third routing equipment is selected according to the second selection process without processing the header portion to determine the destination address.

3. The method of claim 1, wherein the threshold delay is selected to reduce the queueing delay associated with the queue.

4. The method of claim 1, wherein the threshold delay was selected based on a defined amount of reduction of queueing delay of the queue of the third routing equipment.

5. The method of claim 1, further comprising, storing, by the first routing equipment, a routing table comprising the route to the destination routing equipment, wherein the second routing equipment is selected according to the first selection process with reference to the routing table, and wherein the third routing equipment is selected further according to the second selection process without reference to the routing table.

6. The method of claim 1, wherein the third routing equipment is selected further according to the second selection process based on a previously selected routing equipment selected for a previously received communication received prior to the queueing of the communication.

7. The method of claim 1, wherein the network is a packet-switched network and the communication is a packet comprising the header portion and a data portion.

8. The method of claim 1, wherein queueing the communication in the queue comprises queueing the communication in the queue for transmission to the third routing equipment.

9. First network equipment, comprising:
a processor; and
a memory configured to store executable instructions that, when executed by the processor, facilitate performance of operations, comprising:
receiving, from second network equipment via a network, a communication,
selecting, according to a first selection process, third network equipment determined to be on a first route to destination network equipment, and
selecting, according to a second selection process, fourth network equipment on a second route, based on a first indication received from the third network equipment that a queueing delay of a queue of the third network equipment was determined to be at least a threshold delay for the third network equipment, wherein the fourth network equipment is selected according to the second selection process without processing a header portion of the communication.

10. The first network equipment of claim 9, wherein the header portion of the communication comprises a destination address of the destination network equipment, and wherein the fourth network equipment is selected according to the second selection process without processing the header portion to determine the destination address.

11. The first network equipment of claim 9, wherein the operations further comprise transmitting the communication to the fourth network equipment based on the selecting of the fourth network equipment.

12. The first network equipment of claim 9, wherein the threshold delay for the third network equipment was selected based on a defined amount of reduction of queueing delay of the queue of the third network equipment.

13. The first network equipment of claim 9, wherein the network is a packet-switched network and the communication is a packet comprising the header portion.

14. The first network equipment of claim 9, wherein the fourth network equipment is selected according to the second selection process further based on previously selected network equipment selected for a previously received communication prior to receiving the communication.

15. The first network equipment of claim 9, wherein the operations further comprise receiving additional communications, and wherein, until a second indication is received from the third network equipment that the queueing delay of the queue of the third network equipment was determined to be below the threshold delay for the third network equipment, the third network equipment is not selected by the first network equipment according to the first selection process.

16. A non-transitory machine-readable medium comprising executable instructions that, when executed by a processor of a first routing device, facilitate performance of operations, the operations comprising:

receiving, from a second routing device via a packet-switched network, a packet comprising a header portion and a data portion;

in response to a measurement of an aspect of a queue being determined to be at most a threshold value, queueing, in the queue, the packet for a third routing device selected according to a first selection process as being on a route to a destination routing device for the packet; and in response to a queueing delay of the queue being determined to be greater than the threshold value, transmitting the packet to a fourth routing device, wherein the fourth routing device is selected according to a second selection process different than the first selection process, and wherein the fourth routing device is selected according to the second selection process without accessing the header portion of the packet.

17. The non-transitory machine-readable medium of claim 16, wherein the measurement of the aspect of the queue is a queue delay of the queue.

18. The non-transitory machine-readable medium of claim 16, wherein the measurement of the aspect of the queue is a number of packets in the queue.

19. The non-transitory machine-readable medium of claim 16, wherein the header portion of the packet comprises a destination address of the destination routing device, and wherein the third routing device is selected according to the second selection process without processing the header portion to determine the destination address.

20. The non-transitory machine-readable medium of claim 16, wherein the fourth routing device is selected according to the second selection process based on a previously selected routing device selected for a previously received packet prior to the packet.

* * * * *